United States Patent [19]

Antonini et al.

[11] 3,923,913

[45] Dec. 2, 1975

[54] PROCESS FOR OBTAINING CHLORINATED DERIVATIVES OF ETHYLENE

[75] Inventors: Albert Antonini, Paris; Maurice Goharel, Saint-Auban; Claude Kaziz, La Courneuve; Georges Wetroff, Le Thillay, all of France

[73] Assignee: Produits Chimiques Pechiney-Saint-Gobain, Courbevoie, France

[22] Filed: Aug. 2, 1973

[21] Appl. No.: 385,099

Related U.S. Application Data

[63] Continuation of Ser. No. 731,690, May 20, 1968, abandoned, which is a continuation of Ser. No. 453,818, May 6, 1965, abandoned.

[30] Foreign Application Priority Data

May 12, 1964 France .............................. 64.974079

[52] U.S. Cl. ...... 260/654 H; 260/656 R; 260/658 R; 260/659 A; 260/660
[51] Int. Cl.² .......................................... C07C 21/00
[58] Field of Search ..................... 260/656 R, 654 H

[56] References Cited
UNITED STATES PATENTS 2,547,139  4/1951  Randall ........................... 250/654 H
3,055,955  9/1962  Hodges .......................... 260/656 R
3,637,875  1/1972  Correia et al. .................. 260/654 H

OTHER PUBLICATIONS

Roberts et al., "Basic Principles of Organic Chemistry" p. 321 (1965).

*Primary Examiner*—James O. Thomas, Jr.
*Assistant Examiner*—Nicky Chan

[57] ABSTRACT

A process for obtaining chlorinated ethylene derivatives wherein three reactants comprising (a) chlorine and ethane, (b) chlorinated ethane derivatives and (c) ethylene and chlorinated compounds thereof are introduced into a thermal zone maintained between 400° and 650°C; the effluent from the thermal zone is formed into two fractions, one comprising the product of the process and the other comprising hydrochloric acid, ethylene and chlorinated ethylene derivatives. The latter fraction is introduced into a oxychlorination zone along with oxygen for reaction between 200° and 400°C. A mixture comprising chlorinated ethane derivatives in its organic phase is collected at the outlet of this zone and then introduced into the thermal zone.

6 Claims, No Drawings

PROCESS FOR OBTAINING CHLORINATED DERIVATIVES OF ETHYLENE

This is a continuation of copending application Ser. No. 731,690, filed May 20, 1968, now abandoned which in turn is a continuation of application Ser. No. 453,818, filed May 6, 1965, now abandoned.

This invention relates to a method of manufacturing chlorinated ethylene derivatives wherein the starting material comprises chlorinated or unchlorinated $C_2$ hydrocarbons which comprise ethane or which are essentially constituted of ethane.

It is known that the substitutive chlorination of ethane can be achieved at temperatures within the range of 400° to 650°C. This reaction takes place along with the dehydrochlorination of $C_2$ chlorinated saturated compounds resulting in chlorinated ethylene derivatives, such as vinyl chloride, symmetrical or unsymmetrical dichloroethylene, trichlorethylene or tetrachlorethylene. All of these products are extensively used in the chemical industry.

It is also known that chlorinated ethylene derivatives can be obtained by conducting a mild chlorination of ethylene at temperatures in excess of 400°C. The use of ethane is competitive with the use of ethylene because of the lower cost and abundant sources of ethane. It is, however, necessary to use greater quantities of chlorine where ethane is employed. Thus, in obtaining vinyl chloride ($C_2H_3Cl$), the following equations represent the reactions involved:

$$C_2H_6 + 2\ Cl_2 \rightarrow C_2H_3Cl + 3\ HCl$$
$$C_2H_4 + Cl_2 \rightarrow C_2H_3Cl + HCl$$

It will be noticed that for an equivalent quantity of chlorinated ethylene derivative, a greater quantity of hydrochloric acid is formed when starting with ethane.

Various means have been proposed for minimizing the formation of hydrochloric acid and for decreasing chlorine consumption in the ethane reaction. one proposal involves carrying out the fixation of chlorine on the ethane molecule by means of an oxychlorination reaction in gaseous phase. This involves the action of a gaseous mixture of hydrochloric acid, chlorine, and an oxygen containing gas on ethane in the presence of a catalyst. To react ethane under those conditions, it is necessary to work at relatively high temperatures within the range of 400° to 650°C. The presence of oxygen, chlorine, hydrochloric acid and steam at those temperatures makes the reaction mixture extremely corrosive and seriously affects the resistivity of the materials used for carrying out this process. In addition, it is well known that the effective life of the catalyst used at these high temperatures is limited. Furthermore, the secondary reactions of combustion are enhanced at these temperatures and easily reach proportions of the order of 15 to 20 molar percent with respect to the amount of ethane used. If oxygen is used during this reaction, this combustion leads to an oxygen consumption equal to about three times that of ethane, representing a considerable loss in oxygen. If air is used instead of oxygen, the proportion of uncondensable gases in the reactor effluent is high, amounting to 75 to 80 percent by volume of this effluent, thereby leading to problems of gas separation. This presents a very difficult problem, particularly when the effluent contains ethylene and vinyl chloride.

Another proposed solution consists in carrying out the chlorination of ethane in a reactor which is provided with an inert fitting, then separating from the effluent the hydrochloric acid formed during the reaction. The hydrochloric acid is catalytically oxidized between 350° and 500°C in another reactor by means of oxygen or an oxygen containing gas. This amounts to carrying out the so-called Deacon reaction which comprises:

$$4\ HCl + O_2 \rightarrow 2\ Cl_2 + 2\ H_2O$$

This reaction is difficult to carry out because of drawbacks arising due to the use of the high temperatures involved and because of the other aforementioned drawbacks. As a result, this process of obtaining chlorine is not utilized to any significant extent.

It is an object of this invention to provide an improved process for obtaining chlorinated derivatives of ethylene by means of the transformation of ethane and ethane containing mixtures.

It is one particular object of this invention to provide a process for achieving the foregoing object which is characterized by a significantly reduced amount of hydrochloric acid involved in the reaction.

It is a further particular object of this invention to provide a process of the type described which substantially eliminates corrosion problems in the processing.

It is a still further object of this invention to provide a process of the type described which significantly eliminates drawbacks which have characterized the use of oxychlorination catalysts in prior art techniques.

It is a still further object of this invention to provide a process of the type described which is capable of substantially reducing undesirable secondary reactions in the course of the transformation.

It is an additional object of this invention to provide a process of the type described which involves the use of air for supplying oxygen and which, at the same time, does not involve difficult gas separation problems which have previously characterized the use of air in such procedures.

It is a further object of this invention to provide a process of the type described which can be readily controlled and which can be changed with ease thereby permitting the production of a wide variety of chlorinated derivatives of ethylene and combinations thereof with a high degree of selectivity.

These and other objects of this invention will appear hereinafter and it will be understood that the specific examples hereinafter set forth are provided solely for purposes of illustration and not by way of limitation.

The process of the invention is a continuous operation involving the combination of two successive reaction zones. One zone comprises a thermal zone of chlorination and dehydrochlorination, and the other a catalytic oxychlorination zone. Three groups of reagents are introduced into the thermal zone, the first group of reagents being essentially constituted and fed at the rate of $x$ moles/hour of chlorine and $y$ moles/hour of ethane. The second group is essentially constituted of $u$ moles per hour of chlorinated ethane derivatives while the third group is essentially constituted of $v$ moles per hour of ethylene and/or of its chlorinated derivatives, that is a compound selected from the group consisting of vinyl chloride, cis and trans dichloroethylenes, vinylidene chloride, trichloroethylene and tetrachloroethylene. The thermal zone of chlorination and dehydrochlorination is maintained at a temperature ranging from 400° to 650°C and, preferably, from 450° to 550°C, and the feeding of these reagents or of these groups of reagents is carried out in such a way that the ratio $$\frac{u}{x+y}$$

is between 0.5 and 1.5. The value ($v/u$) is lower than 4, and the value $$\frac{x}{y+v}$$

is lower than 3.5 and, preferably, lower than 2.5. The contact time in the thermal zone corresponds to a spatial speed higher than 40 $h^{-1}$, and is preferably comprised between 60 and 1,200 $h^{-1}$. The effluent of the thermal zone is treated continuously so as to constitute two fractions, one of which is freed of hydrochloric acid and of ethylene and which represents the production of the process, and the other one of which contains the entire hydrochloric acid and ethylene present in said effluent as well as chlorinated ethylene derivatives. The latter fraction is introduced in said catalytic oxychlorination zone with oxygen, in amounts between about 5 and 20 percent by volume of this latter fraction taken in the vapor state, or with a gas containing the equivalent quantity of oxygen. The reagents introduced into said oxychlorination zone are maintained for a period of contact time ranging from 1 to 25 seconds and, preferably, between 5 and 20 seconds at a temperature ranging from 200° to 400°C and, preferably, from 250° to 350°C. At the outlet of this oxychlorination zone, there is collected a mixture mainly composed in its organic phase of chlorinated ethane derivatives. Finally, at least a portion of this organic phase is supplied to said thermal zone in order to adjust to $u$ moles the second group of reagents, and to $v$ moles the third group of reagents. According to the invention, the molar ratio ($v/y$) may vary between 0 and 10, and it is preferably below 5. The three groups of reagents may be introduced in the thermal zone of chlorination and dehydrochlorination by any conventional means.

According to an advantageous embodiment of the invention relating to the introduction of the reagents, a mixture of those reagents which are usually in the gaseous state at ordinary temperature is provided. In addition, a mixture of those reagents which are usually in the liquid state at ordinary temperature is provided. The latter mixture is vaporized and is then introduced into the thermal zone at the inlet of which it is mixed with the gaseous reagents.

According to a particular embodiment of the invention, the mixture of the gaseous reagents is maintained in the thermal zone for a contact time of less than 1 second, prior to the effective mixture in the interior of the thermal zone with the vapors of the reagents which are usually liquid. This permits maximum reaction of chlorine with the gaseous reagents.

The thermal zone of chlorination and of dehydrochlorination, according to the invention, may be free of any packing or filling, and in this case, the heat exchange in the reaction mixture, and the heat exchange of the latter with the walls, is carried out through the use of a turbulent flow feed of the reaction mixture. The thermal zone may, however, comprise a solid packing or filling, which may be disposed either in the form of a fixed bed or of a fluid bed. In this case, the heat exchange in the reaction mixture or between the reaction mixture and the walls is enhanced by the packing or filling.

The material of this packing or filling may be selected from the group consisting of silica, alumina, fuller's earth, carbon, diatomaceous earth, silver base alloys, nickel base alloys and corrosion resistant steels such as molybdenum containing steels.

The effluent of said thermal zone which is practically chlorine free is mainly constituted of chlorinated ethylene derivatives, ethylene and hydrochloric acid. This effluent is then treated according to conventional methods, for instance, condensation, washing and distillation. Such operations serve to withdraw a fraction containing one or several chlorinated ethylene derivatives which constitute the production of the process. Another fraction which contains chlorinated ethylene derivatives as well as the totality of ethylene and of hydrochloric acid present in the effluent of said thermal zone, is introduced in the catalytic oxychlorination zone with oxygen or a gas containing oxygen in the manner stated above.

According to a particular alternative of the invention, only 10 to 95 molar percent, and preferably 40 to 80 molar percent, of the effluent of the thermal zone is treated. The remaining portion of the effluent is directly advanced to the catalytic oxychlorination zone without being submitted to any treatment.

The portion of the effluent of the thermal zone treated as stated hereinabove, provides the chlorinated ethylene derivative or derivatives constituting the production, and also provides hydrochloric acid, ethylene and chlorinated ethylene derivatives. These are also introduced, preferably in the vapor phase, into the catalytic oxychlorination zone for joining with the untreated portion of the effluent of the thermal zone. Oxygen or an oxygen containing gas is also introduced at this point.

According to a characteristic of the invention, the proportion of hydrochloric acid with respect to the quantity of reagents before mixing with oxygen or an oxygen containing gas, ranges from 60 to 78 molar percent at the entrance of the catalytic zone.

In order to carry out the reaction in the oxychlorination zone, the method described in copending U.S. application Ser. No. 208,956, filed July 10, 1962, may be used. This method has been found to be particularly applicable to aliphatic hydrocarbons as well as to their partially halogenated derivatives. The oxychlorination temperature is maintained, preferably, within the limits set forth above. Thus, almost all of the chlorinated ethylene derivatives introduced in the catalytic oxychlorination zone are transformed into chlorinated ethane derivatives.

The effluent of the catalytic oxychlorination zone is treated according to conventional means for separating the organic phase which mainly contains chlorinated ethane derivatives. At least a portion of this organic phase is advanced in the thermal zone of chlorination and dehydrochlorination where it is mixed with other reagents, for transformation in accordance with the process of the invention. The chlorinated ethylene compounds possibly present in this organic phase may be used to form part of the third group of reagents. The inorganic phase condensed at the outlet of the oxychlorination zone essentially contains hydrochloric acid and water formed during the oxychlorination reaction. This hydrochloric acid represents less than 25 molar percent and is usually less than 10 molar percent with respect to the totality of the hydrochloric acid involved during the process. This hydrochloric acid residue can be considered as a by-product of the process.

At the outlet of the catalytic oxychlorination zone a gaseous phase mainly constituted of several components such as $N_2$, $O_2$, CO, $CO_2$ as well as traces of organic vapors may also be separated. The latter represent less than 2 percent by volume of this gaseous phase, and are advantageously removed by a rapid washing of the gaseous phase carried out through the use of an organic non-volatile solvent, selected from the group consisting of mineral oils and halogenated aliphatic hydrocarbons containing 4 carbon atoms.

With respect to the organic phase which is separated at the outlet of the catalytic oxychlorination zone, it is important to note that, when the process is operated under the conditions described hereabove, the organic phase is produced in amounts which are generally sufficient to constitute the totality of the second group of reagents introduced in the thermal zone of chlorination and dehydrochlorination. Thus, the formed chlorinated ethane compounds issued from the catalytic zone and advanced to the thermal zone constitute a "ballast" or "regulating balance" of organic compounds which circulate from one zone to the other sustaining chemical transformation according to a process constantly maintained and carried out in a continuous and cyclic fashion of complementary reactions. Chlorination and dehydrochlorination is carried out producing ethylenic compounds and hydrochloric acid, and oxychlorination is also carried out while employing the same compounds.

The existence of this "ballast" or "regulating balance" of organic compounds circulating from one zone to the other, such as that which results from the description of this process, is one highly advantageous characteristic of the invention. In addition, the molar proportion of said "ballast" or "regulating balance" of organic compounds, with respect to the totality of the compounds introduced in said thermal zone, has an influence on the proportion of the used hydrochloric acid in regard to that involved during the process. The existence of this "ballast" or "regulating balance" of organic compounds and its proportion in regard to the totality of the reagents introduced in said thermal zone controls the values of $$\frac{u}{x+y}, \frac{v}{u} \text{ and } \frac{x}{y+v}$$

and also the conditions of treatment of the effluent of said thermal zone.

By selecting the values of $$\frac{u}{x+y}, \frac{v}{u} \text{ and } \frac{x}{y+v}$$

in the field of values stated above, the convenient use of hydrochloric acid involved during the process is achieved, and this constitutes an important aspect of the invention.

The present process is also characterized by its high degree of adaptability. Thus, the production of different mixtures of chlorinated ethylene derivatives can be selected by essentially controlling the different feeds of reagents originating from extraneous sources thereby affecting the molar ratios $$\frac{x}{y+v} \text{ and } \frac{v}{u}.$$

In addition, selectivity is made possible by acting on the conditions of treatment of the effluent of the thermal zone of chlorination and dehydrochlorination or on only a portion of this effluent. The process can be directed towards the production, for example, of tetrachlorethylene, trichlorethylene or of vinyl chloride, or of mixtures thereof with an almost total utilization of the hydrochloric acid involved in the process resulting in all cases, thereby involving a minimal expense with respect to chlorine.

The invention also has the distinct advantage of eliminating practically all corrosion problems in the thermal zone as well as in the catalytic zone. In this connection, a mixture of chlorine, hydrochloric acid and organic compounds is in the thermal zone at high temperatures with the exclusion of water and oxygen. This mixture will not attack various metals or alloys, such as nickel or certain of its alloys, which have excellent corrosion resistance at the considered temperatures. The elements in the catalytic zone are very corrosive when they are considered together, but at temperatures preferably ranging from 250° to 350°C, metals such as iron and ordinary steels are quite suitable for use in this zone.

Other advantages of the invention reside in the use of relatively low temperatures in the catalytic zone. Improved catalyst stability expressed in terms of a long life of more than a thousand hours, and usually of the order of several thousand hours, is thereby achieved. In addition, there is an almost complete suppression of the parasitic combustion reactions of the organic compounds. The latter reactions are, for instance, 10 to 20 times lower than the processes involving oxychlorination reactions at temperatures of 400° to 650°C. This advantage leads to an improvement of the yield of transformation of the reagents involved, including the oxygen transformation yield. This is of particular importance when oxygen is used instead of air in the catalytic oxychlorination zone.

The process of the invention is also advantageous when using in the catalytic oxychlorination zone an oxygen containing gas, such as air, instead of pure oxygen because it enables an easy separation of the constituents of the effluent of said catalytic zone. In this case, separation at the outlet of the zone is conducted in three phases; the first, a gaseous phase, containing inert gases, such as nitrogen; the second, an inorganic phase constituted of acidulated water; and the third, an organic phase. The composition of this organic phase is such that it is practically free of volatile compounds, the most volatile compound being 1,2-dichloroethane. The vapor pressure of this phase is sufficiently low for an almost quantitative separation to be carried out by means of simple cooling, eventually completed by a rapid washing of the gaseous phase by a heavy solvent such as a mineral oil or a halogenated aliphatic hydrocarbon having four carbon atoms.

The following examples are given by way of illustrating the various objects and advantages of the invention and are not to be construed as limiting the invention.

EXAMPLE 1

There is provided a thermal zone of chlorination and of dehydrochlorination consisting of a tubular reactor made of "Inconel" heated on the outside in such a way that the temperature of the vapors of the reaction mixture reaches about 550°C. The first group of reactants is separately introduced as a mixture in the vapor state. The second and third groups of reactants are vaporized and preheated at 200°C, then introduced in the thermal zone where they are quickly mixed with the reactants of the first group. The flow rates are regulated so as to establish a contact time of the vapor of the reaction mixture in the thermal zone of about 12 seconds. The flow rates of the reactants introduced are in the following proportions:

| First reactant group | |
|---|---|
| Ethane | 1 kmole/hour |
| Chlorine | 1.618 kmole/hour |
| Second reactant group | |
| 1,2-Dichloroethane | 0.585 kmole/hour |
| 1,1,2-Trichloroethane | 0.780 kmole/hour |
| Tetrachloroethanes | 0.887 kmole/hour | that is, a molar ratio $$\frac{u}{x+y} = 0.86$$

Third reactant group
Different olefinic compounds ....... 0.060 kmole/hour (mainly cis and trans dichloroethylenes)
that is, a molar ratio $$\frac{v}{y} = 0.060$$

and a molar ratio $$\frac{x}{y+v} = 1.53$$

and a molar ratio $$\frac{v}{u} = 0.02$$

The outgoing vapors from this thermal zone have the following composition:

| | |
|---|---|
| Ethane non reacted | 0.010 kmole/hour |
| Chlorine | <0.002 kmole/hour |
| Ethylene | 0.595 kmole/hour |
| Vinyl chloride | 0.827 kmole/hour |
| Dichloroethylenes and vinylidene chloride | 0.907 kmole/hour |
| Trichloroethylene | 0.903 kmole/hour |
| Tetrachloroethylene | 0.049 kmole/hour |
| Dichloroethanes | 0.002 kmole/hour |
| Tetrachloroethanes | 0.006 kmole/hour |
| Different heavy compounds (B.p. ⩾ 180°C) | 0.007 kmole/hour |
| Hydrochloric acid | 4.833 kmole/hour |

The totality of this effluent is cooled and submitted to a stripping and to bleading off at the top of a distillation column. This enables the separation of almost all of the compounds having a boiling point higher than 80°C. The mixture is submitted to a rectification for separating pure trichloroethylene and small quantities of tetrachloroethane and heavy chlorinated hydrocarbons having a boiling point higher than 180°C.

For each kmole of ethane involved, the following products are obtained:

| | |
|---|---|
| Trichloroethylene | 0.898 kmole |
| Tetrachloroethylene | 0.042 kmole |
| Tetrachloroethanes | 0.006 kmole |
| Different heavy compounds (B.p. ⩾ 180°C) | 0.007 kmole |

The uncondensed compounds and the volatile compounds separated from the production contain 67.5 molar percent of hydrochloric acid. They are advanced in the vapor phase with 130 m³/hour of air, measured at 0°C, 760 mm of Hg, in the catalytic oxychlorination zone, constituted by a tube system packed with a Deacon catalyst using graphite as diluent, and cooled at the outside by means of a circulating heat exchanger fluid, so that the temperature is maintained between 266°C on the coolest point and 334°C at the hottest point. The Deacon catalyst is formed of pellets of activated alumina impregnated with cupric chloride, in the proportion of 10 percent by weight of cation Cu++ with regard to the catalyst. The quantity of air introduced represents a proportion of oxygen of 16.2 percent by volume with regard to the compounds derived from the thermal zone and introduced in the catalytic zone.

At the outlet of the tube system, an aqueous solution of hydrochloric acid is obtained corresponding to the formation of 0.289 kmole/hour of hydrochloric acid. In addition, there is formed an organic phase having a molar composition as follows:

| | |
|---|---|
| 1,2-Dichloroethane | 25.3% |
| 1,1,2-Trichloroethane | 33.7% |
| Tetrachloroethanes | 38.4% |
| Chlorinated olefinic compounds (mainly cis and trans dichloroethylenes) | 2.6% |

This mixture is advanced to the thermal zone, where it constitutes the second and third groups of reactants.

Finally, from the effluent of the catalytic zone a gaseous mixture is separated which is washed by a heavy solvent (composed of chlorinated $C_4$ hydrocarbons having a boiling point higher than 180°C), thus enabling the recovery of a small quantity of chlorinated ethane derivatives drained by this gaseous mixture.

The balance of the process in continuous working is the following:

| | | | |
|---|---|---|---|
| Feed | Ethane | 1 | kmole/hour |
| (Reactants derived from extraneous sources) | Chlorine | 1.618 | kmole/hour |
| Production | Trichloroethylene | 0.898 | kmole/hour |
| | Tetrachloroethylene | 0.042 | kmole/hour |
| Very small quantities of by-products are also formed: | | | |
| Tetrachloroethanes | | 0.006 | kmole/hour |
| Various heavy compounds (B.p. ⩾ 180°C) | | 0.007 | kmole/hour | as well as gas formed by combustion in the catalytic zone of oxychlorination:

| | |
|---|---|
| CO | 0.012 kmole/hour |
| CO₂ | 0.018 kmole/hour |
| Finally, an aqueous solution is collected containing HCl | 0.289 kmole/hour |

This quantity of HCl only represents 6 molar percent of the quantity of this compound involved during the process.

The rate of molar conversion of ethane into trichloroethylene is 89.8 percent and the rate of conversion of chlorine into trichloroethylene is 83.4 percent. The rate of the global molar conversion of chlorine into trichloroethylene and into tetrachloroethylene is about 88.6 percent.

EXAMPLE 2

In order to increase the proportion of tetrachloroethylene in the mixture of trichloroethylene and tetrachloroethylene prepared according to Example 1, the apparatus of this example is used with certain differences in operating technique. Specifically, the flow rate of chlorine is increased up to 1.758 kmole/hour. Furthermore, at the outlet of the thermal zone, only 60 percent by volume of the effluent are treated by stripping and bleeding off at the distillation column top, while the other 40 percent is advanced directly to the catalytic oxychlorination zone. The treated portion of the effluent provides uncondensed products and volatile compounds separated in the bleeding off step with the latter also being advanced to the catalytic oxychlorination zone. In order to take into account these modifications, which have the effect of increasing the proportion of the "ballast" or "regulating balance" of organic compounds involved in the process, the quantity of air advanced to the catalytic oxychlorination zone should be at flow rate of 150 m³/hour (measured at 0° C, 760 mm of Hg). Thus, a new state of equilibrium of the continuously operating system is progressively established. In this system, the flow rate feeds in the thermal zone are as follows:

First group of reactants

| | | |
|---|---|---|
| Ethane | 1 | kmole/hour |
| Chlorine | 1.758 | kmole/hour |
| Second group of reactants | | |
| 1,2-Dichloroethane | 0.563 | kmole/hour |
| 1,1,2-Trichloroethane | 0.778 | kmole/hour |
| Tetrachloroethanes | 0.927 | kmole/hour |
| Pentachloroethane | 0.386 | kmole/hour | that is, a molar ratio $$\frac{u}{x+y} = 0.96.$$

Third group of reactants

| | |
|---|---|
| Dichloroethylenes cis and trans | 0.047 kmole/hour |
| Trichloroethylene | 0.012 kmole/hour |
| Tetrachloroethylene | 0.293 kmole/hour | that is, a molar ratio $$\frac{v}{y} = 0.35$$

a molar ratio $$\frac{x}{y+v} = 1.30$$

and a molar ratio $$\frac{v}{u} = 0.13$$

Under these conditions, the 60 molar percent portion of the effluent of this thermal zone which s submitted to a treatment of separation provides a production, after rectification, which consists essentially of:

| | |
|---|---|
| Trichloroethylene | 0.548 kmole/hour |
| Tetrachloroethylene | 0.409 kmole/hour |

The quantity of hydrochloric acid collected at the outlet of the catalytic oxychlorination zone equals 0.186 kmole/hour, representing 3.4 molar percent of the quantity of hydrochloric acid which is involved in the process.

The proportions of molar conversion of ethane into trichloroethylene and tetrachloroethylene are respectively 54.8 percent and 40.9 percent. The proportion of global molar conversion of chlorine into these two compounds is 96.2 percent.

EXAMPLE 3

In the same apparatus as employed in Example 1, the manufacture of a mixture of chlorinated ethylene derivatives is carried out under the following conditions:

Feed of the thermal zone

First group of reactants

| | | |
|---|---|---|
| Ethane | 1 | kmole/hour |
| Chlorine | 1.705 | kmole/hour |
| Second group of reactants | | |
| 1,2-Dichloroethane | 0.509 | kmole/hour |
| 1,1,2-Trichloroethane | 0.792 | kmole/hour |
| Tetrachloroethanes | 0.610 | kmole/hour |
| Pentachloroethane | 0.405 | kmole/hour | that is, a molar ratio $$\frac{u}{x+y} = 0.86.$$

Third group of reactants

| | |
|---|---|
| Dichloroethylenes cis and trans | 0.032 kmole/hour |
| Trichloroethylene | 0.008 kmole/hour |
| Tetrachloroethylene | 0.608 kmole/hour | that is, a molar ratio $$\frac{v}{y} = 0.65$$

a molar ratio $$\frac{x}{y+v} = 1.03$$

and a molar ratio $$\frac{v}{u} = 0.28$$

The compounds of the second and of the third group of reactants are formed of all of the organic phase condensed in the effluent of the catalytic oxychlorination zone.

At the outlet of the thermal zone, a portion comprising 60 percent by volume of the effluent in the vapor state is advanced to the catalytic zone of oxychlorination, while the remaining 40 percent by volume is submitted to condensation and to stripping. The condensed compounds are separated and constitute the production, while the uncondensed compounds are advanced to the catalytic zone of oxychlorination. The mixture constituted by these uncondensed products and by the untreated portion of the effluent contains 63.5 molar percent of hydrochloric acid. 140 m³/hour of air are added (measured at 0°C, 760 mm of Hg), before the mixture is introduced into the catalytic zone of oxychlorination. The temperature of the vapor mixture is 272°C. In the tubes of the tube system constituting the catalytic zone of oxychlorination, the temperature of the vapors increases after their introduction, to reach a maximum of 341°C.

At the outlet of the tube system, the effluent is cooled and the inorganic and organic phase are separated from the gaseous phase. The latter is washed with a heavy solvent (B.p. ≥ 180°C). The inorganic phase contains 0.432 kmole/hour of hydrochloric acid, that is 8.7 molar percent of the total quantity of hydrochloric acid involved in the process. The organic phase is all advanced to the feed of the thermal zone, where it constitutes the second and third reactant groups.

The production obtained by treating a portion of the effluent of the thermal zone is a mixture, the molar composition of which is the following:

| | |
|---|---|
| Vinyl chloride | 6.4% |
| Cis and trans dichloroethylenes and vinylidene chloride | 27.3% |
| Trichloroethylene | 22.7% |
| Tetrachloroethylene | 38.2% |
| Tetrachloroethanes | 1.6% |
| Pentachloroethane | 2.6% |
| Various heavy compounds (B.p. ≥ 180°C) | 1.2% |

This mixture corresponds to a proportion of molar conversion of ethane of 96.0 percent and to a proportion of molar conversion of chlorine of 87.3 percent.

EXAMPLE 4

In order to carry out the production of a mixture of vinyl chloride and of tetrachloroethylene, the conditions described in Example 1 for the treatment of the effluent in the thermal zone are modified. At the outlet of the thermal zone, the portion of the effluent which is desired to be treated is submitted to condensation and to stripping by which a mixture containing the hydrochloric acid, ethylene and vinyl chloride present, is separated at the top of the column, as well as other compounds. This gaseous mixture is methodically washed so as to extract almost quantitatively the chlorinated compounds, while ethylene and hydrochloric acid are advanced to the oxychlorination zone. The washing solution is distilled in order to separate, on the other hand, vinyl chloride which constitutes a portion of the production, and on the other hand, a mixture of chlorinated ethylene derivatives which is advanced to the oxychlorination zone. Finally, the portion of the effluent condensed during the initial stripping is treated as by distillation to quantitatively extract the compounds having a boiling point lower than 120°C, these compounds then being advanced to the oxychlorination zone. Thus, for production, only vinyl chloride and compounds having a boiling point higher than 120°C are retained, all the other products obtained in the effluent of the thermal zone being advanced to the oxychlorination zone.

The apparatus being thus modified, a continuous operation is established in equilibrium balance according to the operation of Example 1. The operation of these examples is characterized as follows:

Feed of the Thermal Zone

First group of reactants

| | | |
|---|---|---|
| Ethane | 1 | kmole/hour |
| Chlorine | 1.286 | kmole/hour |

Second group of reactants

| | | |
|---|---|---|
| 1,2-Dichloroethane | 0.687 | kmole/hour |
| 1,1,2-Trichloroethane | 0.361 | kmole/hour |
| Tetrachloroethanes | 0.398 | kmole/hour |
| Pentachloroethane | 0.408 | kmole/hour | that is, a molar ratio $$\frac{u}{x+y} = 0.75$$

Third group of reactants

| | |
|---|---|
| Cis and trans dichloroethylenes | 0.009 kmole/hour |
| Trichloroethylene | 0.004 kmole/hour |
| Tetrachloroethylene | 0.275 kmole/hour | that is, a molar ratio $$\frac{v}{y} = 0.29$$

a molar ratio $$\frac{x}{y+v} = 1.00$$

and a molar ratio $$\frac{v}{u} = 0.15$$

Effluent of the Thermal Zone

| | |
|---|---|
| Ethane | 0.060 kmole/hour |
| Ethylene | 0.700 kmole/hour |
| Vinyl chloride | 0.836 kmole/hour |
| Cis and trans dichloroethylenes and vinylidene chloride | 0.426 kmole/hour |
| Trichloroethylene | 0.416 kmole/hour |
| Tetrachloroethylene | 0.685 kmole/hour |
| Tetrachloroethanes | 0.002 kmole/hour |
| Various heavy compounds (B.p. ≥ 180°C) | 0.004 kmole/hour |
| Hydrochloric acid | 4.082 kmole/hour |

A 40 molar percent portion of this effluent is directly advanced to the oxychlorination zone while the remaining 60 molar percent portion is submitted to the separation treatment mentioned above. 11.6 molar percent of vinyl chloride is contained therein and there is collected, in the vapor phase, after washing and distillation:

| | |
|---|---|
| Vinyl chloride | 0.488 kmole/hour |

The liquid phase portion, after stripping and after distillation at temperatures up to 120°C is collected as follows:

| | |
|---|---|
| Tetrachloroethylene | 0.417 kmole/hour |
| Tetrachloroethanes | 0.002 kmole/hour |
| Various heavy compounds | 0.004 kmole/hour |

All the other compounds are advanced to the catalytic zone of oxychlorination and are mixed with the 40 percent of the untreated effluent, then with air at a rate of 120 m³/hour (measured at 0°C, 760 mm of Hg).

Before being mixed with the air, the quantity of mixture advanced to the catalytic zone represents a flow rate of 6.30 kmoles/hour corresponding to the following molar composition expressed in percent:

| | |
|---|---|
| Ethane | 0.95 |
| Ethylene | 11.10 |
| Vinyl chloride | 5.53 |
| Cis and trans dichloroethylenes and vinylidene chloride | 6.75 |
| Trichloroethylene | 6.61 |
| Tetrachloroethylene | 4.26 |
| Hydrochloric acid | 64.80 |

The reaction in the catalytic zone of oxychlorination is carried out between 260° and 336°C, which is the temperature of the warmest point. The effluent of the catalytic zone provides, after condensation, an organic phase which includes the following compounds:

| | |
|---|---|
| 1,2-dichloroethane | 0.687 kmole/hour |
| 1,1,2-trichloroethane | 0.361 kmole/hour |
| Tetrachloroethanes | 0.398 kmole/hour |
| Pentachloroethane | 0.408 kmole/hour |
| Cis and trans dichloroethylenes | 0.009 kmole/hour |
| Trichloroethylene | 0.004 kmole/hour |
| Tetrachloroethylene | 0.275 kmole/hour |

This organic phase is advanced for the feed of the thermal zone and constitutes the second and third groups of reactants.

The gaseous phase issued from the oxychlorination zone, after washing with a heavy solvent (B.p. ≥ 180°C), mainly includes nitrogen and drained ethane, carbon monoxide and carbon dioxide in the following proportions:

| | |
|---|---|
| Ethane | 0.058 kmole/hour |
| CO | 0.008 kmole/hour |
| $CO_2$ | 0.016 kmole/hour |

The inorganic phase issued from the oxychlorination zone includes, in particular:

| | |
|---|---|
| HCl | 0.357 kmole/hour |

This comprises 8.7 molar percent of all of the hydrochloric acid involved in the process.

Under these conditions, the process provides for the transformation of ethane into vinyl chloride and tetrachloroethylene with respective conversion rates of 48.8 and 41.7 molar percent.

The total molar conversion rate of chlorine into these two products is 83.8 percent.

EXAMPLE 5

The process is modified for improving the production of vinyl chloride secured according to Example 4, by complementing the third reactant group with ethylene in amounts close to the amount of ethane introduced in the thermal zone.

This thermal zone is constituted by a fluidized bed reactor, the bed of which is made of particles of diatomaceous earth, which have a diameter of 80 to 150 $\mu$. The ratio of height/diameter of the bed equals about 5. The ascending velocity of the gases equals 35 cm/sec. The contact time spent by the vapors of the reaction mixture in the bed is of the order of 8 seconds. The temperature is maintained at about 450°C and heating is not necessary for maintaining the reactor temperature at this level. The reactor does not necessitate heating.

During feeding, the reactants which are normally gaseous at ordinary temperature, that is, chlorine, ethane and ethylene, are introduced together at the bottom of the bed. The reactants normally liquid at ordinary temperature are mixed and vaporized and these vapors are pre-heated at 175°C and injected in the fluidized bed 35 cm above the bottom of the bed.

The three groups of reactants introduced in the thermal zone are the following:

| First group | | |
|---|---|---|
| Ethane | 1 | kmole/hour |
| Chlorine | 1.807 | kmole/hour |
| Second group | | |
| 1,2-dichloroethane | 1.471 | kmole/hour |
| 1,1,2-trichloroethane | 0.250 | kmole/hour |
| Tetrachloroethanes | 0.367 | kmole/hour |
| Pentachloroethane | 0.429 | kmole/hour | that is, a molar ratio $$\frac{u}{x+y} = 0.90$$

| Third group | |
|---|---|
| Ethylene | 1.029 kmole/hour |
| Cis and trans dichloroethylenes | 0.036 kmole/hour |
| Trichloroethylene | 0.012 kmole/hour | that is, a molar ratio $$\frac{v}{y} = 1.08$$

a molar ratio $$\frac{x}{y+v} = 0.87$$

and a molar ratio $$\frac{v}{u} = 0.43$$

The effluent of the thermal zone comprises:

| | |
|---|---|
| Ethane | 0.058 kmole/hour |
| Ethylene | 1.471 kmole/hour |
| Ethyl chloride | 0.010 kmole/hour |
| Vinyl chloride | 1.707 kmole/hour |
| Cis and trans dichloroethylenes and vinylidene chloride | 0.278 kmole/hour |
| Trichloroethylene | 0.371 kmole/hour |
| Tetrachloroethylene | 0.425 kmole/hour |
| Tetrachloroethanes | 0.007 kmole/hour |
| Various heavy compounds (B.p. ≥ 180°C) | 0.004 kmole/hour |
| Hydrochloric acid | 5.233 kmole/hour |

By stripping, washing and distillation as in Example 4, the mixture when separated yields 1.457 kmole/hour of vinyl chloride and 0.420 kmole/hour of tetrachloroethylene. This corresponds to a molar yield in vinyl chloride of 71.8 percent and to a molar yield in tetrachloroethylene of 20.7 percent with respect to the sum of the ethane and ethylene involved.

All the compounds having a boiling point lower than 120°C, except the vinyl chloride separated as the production of the process, are advanced in the vapor state to the oxychlorination zone according to the method of Example 4. This mixture contains 67.8 molar percent of hydrochloric acid. An addition of 150 m³/hour of air (measured at 0°C, 760 mm of Hg) is made before introducing the vapor into the catalytic zone. This catalytic zone is identical to the one described in Example 1. The temperature is maintained between 271° and 338°C.

At the outlet of this catalytic zone, an organic phase is separated, which is advanced to the feed of the thermal zone after vaporization, where it consists of the mixture of compounds which are usually liquid at ordinary temperature and which are introduced at 35 cm above the bottom of the fluidized bed. At the outlet of the catalytic zone, a gaseous phase rich in nitrogen, draining 0.012 kmole/hour of carbon monoxide and 0.016 kmole/hour of carbon dioxide is collected, as well as unused ethane and traces of organic vapors. Finally, an aqueous phase is obtained which only contains 0.199 kmole/hour of hydrochloric acid, that is 3.8 molar percent of the quantity of hydrochloric acid involved in the process.

The molar conversion rates of chlorine into vinyl chloride and tetrachloroethylene are respectively 40.3 percent and 46.5 percent.

It will be appreciated that the techniques described provide solutions for various difficulties and drawbacks previously encountered during the production of chlorinated derivatives of ethylene. The techniques described provide for the production of a very small amount of hydrochloric acid with the quantity of acid remaining being less than 25 molar percent of the amount involved in the reactions, and this figure can readily be held to less than 10 percent of the amount. Virtually all corrosion problems are reduced and secondary reactions of the type previously discussed are limited to less than 1 molar percent of the hydrocarbons involved in the reactions. The process provides for the use of oxygen or oxygen containing gas in limited amounts enabling high oxygen transformation yeild. In this connection, air can readily be employed without presenting any substantial difficulties with regard to the separation of gaseous products of the invention. All of these advantages are achieved in addition to the fact that the process is extremely susceptible to the production of varieties of ethylene chlorinated compounds. The production can be accomplished on an extremely selective basis, and more than 90 molar percent of an ethylene chlorinated derivative can readily be obtained from ethane or from a chlorinated or unchlorinated hydrocarbon mixture containing ethane.

It will be understood that various changes and modifications may be made in the above described process which provide the characteristics of this invention without departing from the spirit thereof, particularly as defined in the following claims.

We claim:

1. A continuous process for obtaining chlorinated ethylene derivatives wherein there are provided two successive reaction zones, one zone comprising a thermal zone for thermal chlorination and dehydrochlorination, and the other zone comprising an oxychlorination zone for catalytic oxychlorination, providing a regulating balance of $C_2$ compounds from one zone to the other, said process comprising the steps of introducing into said thermal zone three groups of reactants, the first of said groups consisting essentially of chlorine introduced at the rate of $x$ moles/hour and ethane introduced at the rate of $y$ moles/hour, the second of said groups consisting essentially of chloroethanes introduced at the rate of $u$ moles/hour as the regulating blanace from the oxychlorination to the thermal zone, and the third of said groups consisting essentially of a member selected from the group consisting of ethylene and at least one compound selected from the group consisting of vinyl chloride, vinylidene chloride, cis and trans dichloroethylenes, trichloroethylene and tetrachloroethylene introduced at the rate of $v$ moles/hours, maintaining said thermal zone at a temperature between 400° to 650°C, the feeding of said groups of reactants being conducted whereby the ratio $$\frac{u}{x+y}$$

is between 0.5 and 1.5, $(v/u)$ is lower than 4, and $$\frac{x}{y+v}$$

is lower than 3.5, maintaining the contact time in the thermal zone to provide a space velocity higher than 40 $h^{-1}$ but not over 1200 $h^{-1}$, the effluent from said thermal zone comprising a mixture of hydrochloric acid, ethylene and at least one compound selected from the group consisting of vinyl chloride, vinylidene chloride, cis and trans dichloroethylenes, trichloroethylene and tetrachloroethylene, dividing the effluent from the thermal zone into two portions in which a first portion, forming 5 to 90 molar percent of the effluent, is introduced directly into the oxychlorination zone and a second portion comprising 10 to 95 molar percent of the effluent, treating the second portion for separation into one fraction free of hydrochloric acid and ethylene and thereby comprising the product of the process of one other fraction containing hydrochloric acid and ethylene, introducing said other fraction into the oxychlorination zone along with the first portion with the total hydrochloric acid introduced into the oxychlorination zone comprising 60 to 78 molar percent, based on the moles of compounds in the first portion and said other fraction and from which the hydrochloric acid is derived, and then introducing an oxygen containing gas into said oxychlorination zone with the oxygen representing 5 to 20 percent of the volume of said first portion and said other fraction taken in the vapor state, maintaining the reactants in said oxychlorination zone for a period of time between 1 and 25 seconds at a temperature ranging between 200° and 400°C, collecting at the outlet of the oxychlorination zone a mixture comprising an organic phase containing chloroethanes, and introducing said organic phase into said thermal zone to thereby adjust to u moles said second reactant group and to v moles of said third reactant group.

2. A process according to claim 1 wherein said thermal zone is maintained at a temperature between 450° and 550°C.

3. A process according to claim 1 wherein the ratio $$\frac{x}{y+v}$$

is lower than 2.5.

4. A process according to claim 1 wherein the ratio (v/y) is not greater than 10.

5. A process according to claim 1 wherein the introduction of the reactants is carried out in said thermal zone by preparing a first mixture of the components of the three groups of reactants which are normally gaseous at ordinary temperature, preparing a second mixture of the reactants which are normally liquid at ordinary temperature, vaporizing said second mixture, and then introducing the mixtures into said thermal zone.

6. A process according to claim 1 in which said thermal zone is free of packings.

* * * * *

UNITED STATES PATENT OFFICE
CERTIFICATE OF CORRECTION

Patent No. 3,923,913                          Dated December 2, 1975

Inventor(s) Albert Antonini et al.

It is certified that error appears in the above-identified patent and that said Letters Patent are hereby corrected as shown below:

Column 13, line 37, "$260°$" should read -- $261°$ --.

Column 16, lines 29-30, after "regulating" "blanace" should read -- balance --.

Signed and Sealed this

Fourteenth Day of September 1976

[SEAL]

Attest:

RUTH C. MASON
*Attesting Officer*

C. MARSHALL DANN
*Commissioner of Patents and Trademarks*